Feb. 6, 1951 J. H. GANZER 2,540,940
STORAGE DISPLAY CABINET
Filed July 23, 1945 2 Sheets-Sheet 1

INVENTOR.
John H. Ganzer
BY Wallace and Connow
ATTORNEYS

Feb. 6, 1951 J. H. GANZER 2,540,940
STORAGE DISPLAY CABINET
Filed July 23, 1945 2 Sheets-Sheet 2
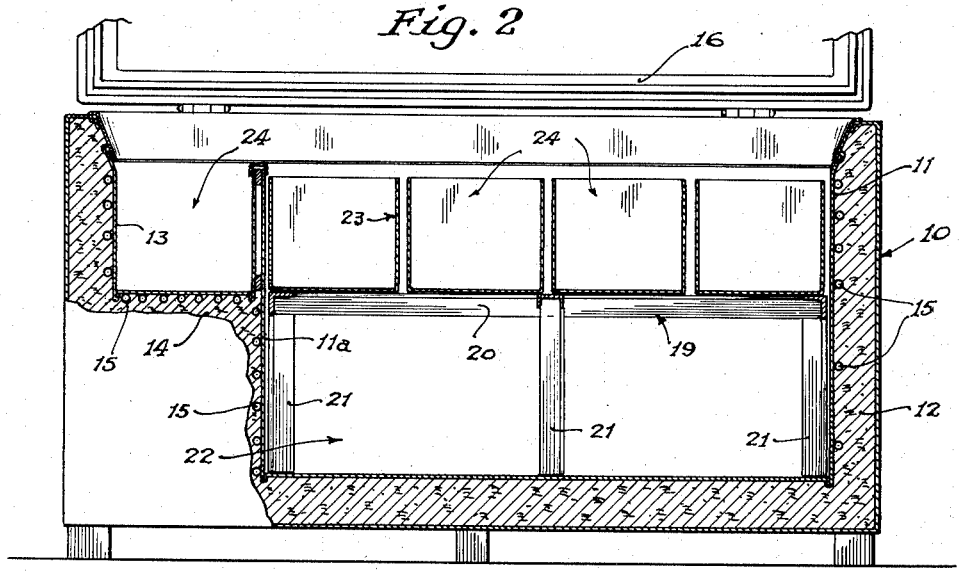
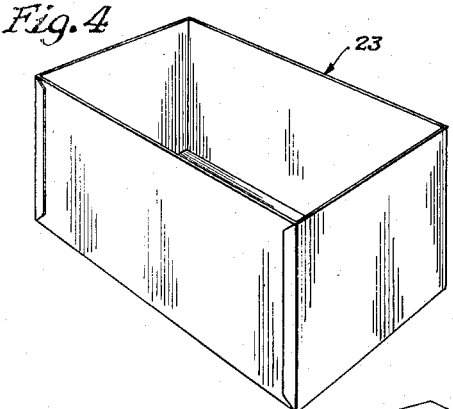
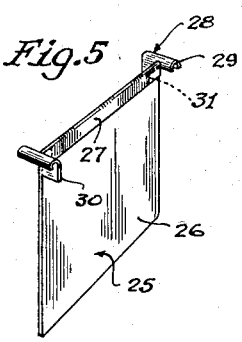
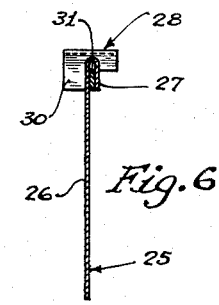
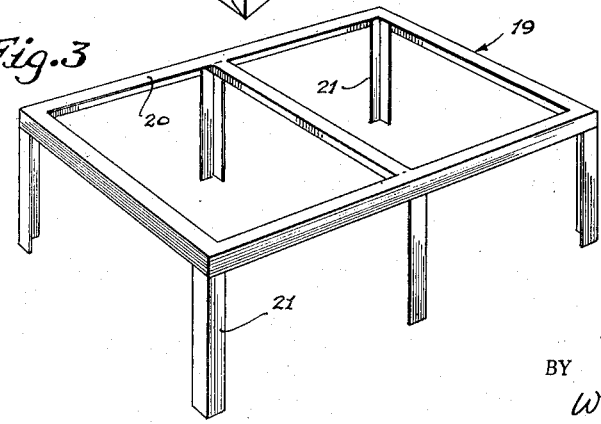
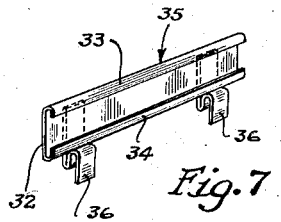
INVENTOR.
John H. Ganzer
BY
Wallace and Connon
ATTORNEYS Patented Feb. 6, 1951

2,540,940

UNITED STATES PATENT OFFICE 2,540,940

STORAGE AND DISPLAY CABINET

John H. Ganzer, Duluth, Minn., assignor to The Coolerator Company, Duluth, Minn., a corporation of Minnesota Application July 23, 1945, Serial No. 606,631

2 Claims. (Cl. 312—168)

This invention relates to storage and display cabinets and particularly to cabinets of this character that may be employed for storage, display and vending of frozen food products and the like.

In retail stores and the like where frozen food products are vended it has been customary heretofore to provide a storage cabinet having a plurality of bins opening through the top of the cabinet, each closed by a separate lid, and the products to be vended have been stored, in such bins. Like products have usually been stored together in a particular one of such bins and it has therefore been necessary heretofore to locate the particular bin in which a desired product was stored and because of this it has usually been necessary to raise several lids in order to locate the particular product desired. Moreover, in the arrangements to which resort has been had heretofore, no convenient way has been afforded for associating the price and like data directly with the respective stored products and it has usually been necesary to refer to a separate chart or the like to determine the price and like data with respect to a particular product.

Still further, in arrangements to which resort has been had heretofore and particularly in those instances where frozen food products and the like have been stored in bins, such as those to which reference has been made hereinabove, all of the products of a like nature have customarily been stored in a particular bin and as the supply of a particular product was depleted, it has been necessary to reach further and further down into the bin in order to pick up a particular product, and this has ofttimes been objectionable.

In view of the foregoing and kindred objections that have been encountered heretofore in the storage and display of frozen food products, it is among the primary objects of my invention to so arrange a cabinet in which frozen food products may be stored that a single closure member will be employed so that when this closure member is moved to open position all of the various kinds of products in the cabinet will be displayed simultaneously.

Yet another object of this invention is to utilize containers, in each of which several packages of a frozen food product or the like may be stored, and to so support such containers that access may be readily had thereto even though the supply of a particular product in a particular container is depleted, and an object ancillary to the foregoing is to support containers of the aforesaid character in a refrigerated cabinet or the like in such a way that additional supplies of the various frozen food products or the like may be stored in the cabinet in such manner as to enable replenishment of the supply of a particular product when the supply of such product in a particular container is depleted or exhausted.

Still another object of this invention is to so arrange containers for frozen food products or the like that are to be disposed in a refrigerator cabinet that such containers may be divided into one or more sections so as to enable one or more different frozen food products or the like to be arranged within a single container, and an object ancillary to the foregoing is to enable the division of containers of the aforesaid character into sections to be effected in such a way that the size of the sections may be varied as desired or so that an entire container may be used for the storage and display of a particular frozen food product or the like should it be desired so to do.

A further object of this invention is to enable data, such as prices and the like, to be directly associated with stored and displayed frozen food products or the like in such manner so as to enable a prospective purchaser to readily ascertain the price and other data with respect to a particular product.

More specific objects of this invention are to utilize in a refrigerated cabinet a support rack of such nature that it will afford a storage area within the cabinet; to dispose containers or the like on the support rack in such position that access may be readily had to the interior of such containers; and to utilize removable partitions that may be disposed in containers of the aforesaid nature at selected positions therein so as to thereby enable the containers to be divided into pockets or sections of different sizes when so desired.

Other and further objects of the present invention will be apparent from the following description and claims and are illustrated in the accompanying drawings which, by way of illustration, show a preferred embodiment and the principle thereof and what I now considerd to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 2 is a longitudinal sectional view through the storage compartment of a cabinet shown in Fig. 1;

Fig. 3 is a perspective view of a rack utilized in the storage compartment as shown in Fig. 2;

Fig. 4 is a perspective view of one of the containers mounted in the storage compartment as shown in Fig. 2;

Fig. 5 is a perspective view of a removable partition that may be utilized with a container such as that shown in Fig. 4;

Fig. 6 is a vertical sectional view taken near one end of the partition shown in Fig. 5; and Fig. 7 is a perspective view of a holding device that may be utilized in association with a container like that shown in Fig. 4 or a partition like that shown in Fig. 5 to enable a price or like data to be displayed in association with a frozen food product or the like arranged adjacent to such holder.

Figure 1:
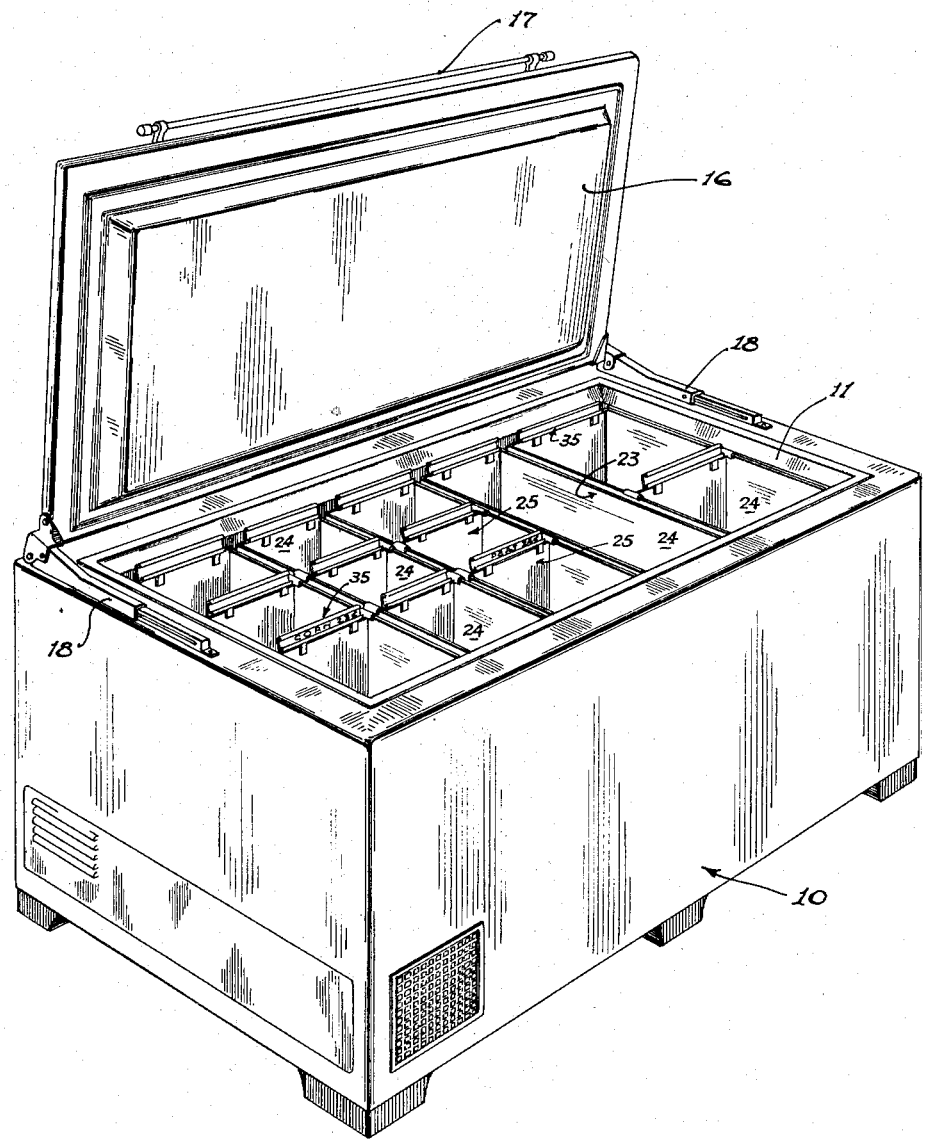
Fig. 1 is a perspective view of a refrigerated cabinet in which a selected embodiment of my invention has been arranged and wherein the closure such as a lid or door for the cabinet is shown in open position.

In the accompanying drawings I have shown a refrigerated cabinet generally indicated by 10 which is desirably of the self-contained type, which is to say, one end of the cabinet is arranged to afford a compartment in which portions of a refrigerating system may be disposed such, for example, as the condenser and compressor of such system as well as the means for driving such compressor. It will be understood, however, that resort could be had to other arrangements affording a refrigerated area without departing from the ambit of my invention.

The cabinet shown in Fig. 1 includes an inner liner 11 that is spaced inwardly from the end wall of the cabinet disposed opposite the end of the cabinet whereat the aforesaid elements of a refrigerating system are located. The liner 11 also includes front and rear walls that are respectively spaced inwardly from the front and rear walls of the cabinet 10. The liner 11 also includes an end wall 11a which is disposed adjacent to the inner wall of the compartment in which the aforesaid elements of a refrigerating system are stored. The bottom wall of the inner liner is arranged in spaced relation with the bottom wall of the cabinet 10. Suitable insulation, generally indicated by 12, is disposed between the various walls of the inner liner and the adjacent walls of the cabinet 10 from which the walls of the inner liner are respectively spaced as aforesaid.

Inasmuch as the compartment in which the aforesaid elements of a refrigerating system are mounted need not extend to the top of the cabinet 10, a supplemental inner liner 13 is provided above this compartment and between the wall 11a of the inner liner and the adjacent end of the cabinet 10, insulation 14 being provided about the inner liner 13, except about the wall thereof adjacent the wall 11a. This insulation 14 also extends along the portion of the vertical wall 11a that is aligned with the aforesaid compartment in which elements of a refrigerating system are mounted.

The evaporator or cooling unit of the refrigerating system, in the present instance, consists of tubing as 15 which is suitably adhered, in any suitable manner, such as by welding to the walls of inner liners 11 and 13 faced toward the insulation 12 and 14. Suitable means, well understood in the art, are interposed between the condenser of the refrigerating system and such evaporator to control the admission of refrigerant into the evaporator so that such refrigerant will expand in the evaporator and thereby extract heat from the area enclosed by the liners 11 and 13.

As best shown in Figs. 1 and 2, the area enclosed by the liners 11 and 13 is open at the top and a suitable lid 16 is hingedly connected to the cabinet 10 so as to be movable to and from position to close the upper side of the area enclosed by the liners 11 and 13. Where desired, a suitable latch mechanism may be provided for latching the door 16 in closed position and such latch mechanism may be controlled by the bar 17 which desirably extends along the front free edge of the door 16 so that it may be grasped at various positions along this lid to enable unlatching of the latch mechanism and to facilitate moving the lid to the open position in which it is shown in Fig. 1. Hence, a bar as 17 will be provided whether or not a suitable latch is provided for latching the lid 16 in closed position. Likewise suitable means such as that generally indicated by 18, Fig. 1, may be associated with the lid 16 to limit movement thereof toward open position and to be effective to releasably retain the lid 16 in the open position in which it is shown in Fig. 1.

The refrigerated cabinet thus far described is a preferred arrangement of a cabinet in which my invention may be embodied but it will be understood that resort may be had to other arrangements without departing from the purview of my invention. It is desirable, however, that a refrigerated area be afforded which is open at the top and that such open top be closed by a suitable lid 16, so that when such a lid is moved to open position the upper portion of the refrigerated area will be displayed.

In accordance with my invention I utilize a rack or stand such as that generally indicated by 19 which desirably includes a horizontally disposed supporting platform 20 and vertically extending legs as 21 which depend from the platform as 20. In the present instance the rack 19 is arranged to rest on the bottom wall of the liner 11 so as to extend between the wall 11a and the opposite end wall of the liner and between the walls of the liner respectively spaced from the front and rear walls of the cabinet 10. Furthermore, the combined height of the legs 21 and supporting platform 20 is advantageously such that the platform is supported approximately half way between the bottom wall of the liner and the open top of the area enclosed by the liner. The rack 19 may be made of angle iron welded or otherwise joined together, but it will be understood that resort may be had to other arrangements to afford a suitable supporting rack as 19. When the rack 19 is rested on the bottom wall of the liner, the area below the platform 20 affords a storage space generally indicated by 22, the purpose of which will be explained presently.

In accordance with my invention a plurality of bins or containers generally indicated by 23 are provided and these are desirably formed from sheet metal cut, bent and united to afford a rectangular box open at the top. Such boxes are preferably sized so that a plurality thereof may be accommodated between the wall 11a and the end wall of the liner 11 opposite the wall 11a, and desirably the containers 23 are of such length as to extend between the walls of the liner 11 respectively spaced from the front and rear walls of the liner 11. Therefore, as best shown in Figs. 1 and 2, a plurality of containers as 23 may be arranged in side by side relation to rest on the supporting platform 20.

Desirably the liner 13 affords an area much like that afforded by each of the containers 23 so that when a plurality of containers as 23 are disposed on the platform 20, the liner 13 and the various containers 20 will cooperate to afford a plurality of storage and display spaces generally indicated by 24, each open at the top and so disposed that when the door 16 is opened access may be had thereto.

Frozen food products or the like may be introduced into various storage and display spaces 24, but since it is advantageous to store and display a wide variety of frozen food products, it may ofttimes be advantageous to divide the storage and display spaces 24 into pockets or sections. To this end resort may be had to partitions such as that illustrated in Figs. 5 and 6 and generally indicated by 25. Each partition 25 consists of a flat plate 26 that is so related to the height of a container as 23 to terminate in slightly spaced relation from the bottom wall of such a container when the partition as 25 is arranged within the container. In order to support the plate as 26 in a storage space as 24, the upper edge thereof is desirably folded as indicated in Fig. 6 to afford a flange 27. A bracket generally indicated by 28 is provided at the end of the upper edge of a plate as 26 and each such bracket includes an elongated substantially U-shaped portion 29 which is desirably arranged to open downwardly and which terminates in an abutment section 30 that is adapted to bear against an adjacent portion of the plate 26 in right angular relation therewith. A portion of each abutment edge 30 below the U-shaped portion 29 is desirably folded into right angular relationship with the abutment edge 30 so as to thereby afford a tongue as 31 which is extended between the flange 27 and the adjacent portion of the plate 26, and such tongue is desirably welded or otherwise suitably secured to the plate 26. The brackets as 28 are therefore so connected to a plate as 26 that when the U-shaped portions 29 are disposed in position to respectively embrace the upper edges of opposite side walls of a container as 23, or opposite walls of the liner 13, a partition as 25 is disposed in a storage space as 24 so as to divide the space into sections or pockets. As shown in Fig. 1, partitions as 25 may be entirely omitted from a space as 24, or one or more such partitions may be arranged in such space to divide the same into two or more sections.

When no partition as 25 is arranged in a container as 23, a particular kind of frozen food product may be stored in this particular container so as to thereby afford a rather large supply of such a product in position to be displayed when the lid 16 is moved to open position. When but a single partition as 25 is arranged in a container as 23 or a storage space as 24, it may, for example, be located midway between opposite ends of such a container to thereby divide the container into two storage and display spaces of approximately equal proportions, into each of which space a particular frozen food product or the like may be introduced. However, since the partitions as 25 may be readily moved into various positions, in some instances it will be desirable to dispose a partition as 25 other than substantially midway between opposite ends of a container as 23 so as to thereby afford storage and display spaces of unequal size so that a larger quantity of one particular product may be displayed in the larger of such spaces while a smaller quantity is displayed in the smaller of such spaces. Furthermore, as illustrated in Fig. 1, two or even more partitions may be arranged in each container as 23 so as to divide the storage space 24 afforded thereby into sections or pockets for the accommodation of different frozen food products or the like.

Inasmuch as the frozen food products disposed in the divided or undivided storage spaces 24 will be open to view as soon as the lid 16 is moved to open position, it is desirable to associate with each of the different food products arranged in the divided or undivided storage spaces 24 price tickets or the like. To this end I provide a holder such as that illustrated in Fig. 7. As shown, each such holder consists of an elongated flat plate as 32 which has the opposite longer edges thereof rolled to afford flanges as 33 and 34 whereby a ticket or the like may be slid into the flanges 33 and 34 to thereby be retained in the holder which is generally indicated by 35. Desirably each holder as 35 is of sufficient length to enable the name of a particular frozen food product to be printed or otherwise arranged on a card or ticket to be disposed in the holder as well as the price of such product. In order to support the holder as 35 in position either on an end wall of a container as 23 or the upper wall of a partition as 25, brackets as 36 are provided which consist of limb portions that are secured to the face of the plate 32 opposite that on which the flanges 33 and 34 are provided and these brackets also include substantially U-shaped portions that are arranged to embrace the upper edge of a partition as 25 or the end wall of a container as 23.

Inasmuch as a somewhat limited supply of the various frozen food products may be accommodated in the divided or undivided storage spaces as 24, it is advantageous to store additional supplies of such products in the refrigerated cabinet and the storage space 22 is utilized for this purpose. Thus, supplies of the various food products that are arranged in the divided or undivided spaces 24 are stored in the storage space 22 prior to the time the containers 23 are disposed on the platform 20. Thus, when the supply of a particular product in one of the spaces 24 is depleted or exhausted, an attendant may lift out one of the containers 23 and thereby gain access to the additional supply of the products in the storage space 22 and thereupon replenish the supply of the particular products in the various storage spaces 24.

It will be manifest from the foregoing description that an arrangement such as that described hereinabove enables a plurality of different frozen food products or the like to be disposed in a refrigerated space in such manner that when a closure member is moved to open position all of such products are simultaneously displayed with prices and like data in association therewith whereby the hereinabove set forth and kindred objects of this invention are realized. However, while I have illustrated and described a selected embodiment of my invention, it will be understood that this is capable of variation and modification and I therefore do not wish to be limited to the precise details set forth but desire to avail myself of such changes and alterations as fall within the purview of the following claims.

I claim:

1. A storage and display cabinet of rectangular shape having a main refrigerated space and a rectangular shaped compartment at one end of the cabinet extending across the same in the lower part thereof and in which a refrigerating system for said space may be arranged, said cabinet having a supplemental space above said compartment defined by an open top rectangular shaped enclosure and which is also refrigerated by said system, the cabinet including an open top through which access may be had to said main and supplemental refrigerated spaces, a closure for closing the open top and movable to open position to afford access to the refrigerated main and supplemental spaces, a plurality of open top rectangular shaped containers, a rack in said main refrigerated space supporting the containers therein disposed transversely thereof in side by side relation with each other and with said supplemental space whereby access may be had to the spaces enclosed by said containers and to said supplemental space when the closure is moved to open position, said rack including a rectangular shaped horizontally disposed open frame providing a platform that is spaced from the bottom of the main refrigerated space to extend substantially level with the bottom of the enclosure defining said supplemental space whereby a storage space is afforded in the refrigerated area beneath said containers, said containers each being of approximately the same height and width as the height and width of said supplemental space enclosure.

2. A storage and display cabinet of rectangular shape having a main refrigerated space and a rectangular shaped compartment at one end of the cabinet extending across the same in the lower part thereof and in which a refrigerating system for said space may be arranged, said cabinet having a supplemental space above said compartment defined by an open top rectangular shaped enclosure and which is also refrigerated by said system, the cabinet including an open top through which access may be had to said main and supplemental refrigerated spaces, a closure for closing the open top and movable to open position to afford access to the refrigerated main and supplemental spaces, a plurality of open top rectangular shaped containers, a rack in said main refrigerated space supporting the containers therein disposed transversely thereof in side by side relation with each other and with said supplemental space whereby access may be had to the spaces enclosed by said containers and to said supplemental space when the closure is moved to open position, said rack including a rectangular shaped horizontally disposed open frame providing a platform that is spaced from the bottom of the main refrigerated space to extend substantially level with the bottom of the enclosure defining said supplemental space whereby a storage space is afforded in the refrigerated area beneath said containers, said containers each being of approximately the same height and width as the height and width of said supplemental space enclosure, and transverse partitions in some of said containers or said supplemental enclosure for dividing the space enclosed thereby into separate sections.

JOHN H. GANZER.

REFERENCES CITED

The following references are of record in the file of this patent:

UNITED STATES PATENTS

| Number | Name | Date |
| --- | --- | --- |
| 937,659 | Todd | Oct. 19, 1909 |
| 2,020,373 | Petzold | Nov. 12, 1935 |
| 2,076,173 | Cocks | Apr. 6, 1937 |
| 2,089,341 | Cocks | Aug. 10, 1937 |
| 2,155,284 | Steenstrup | Apr. 18, 1939 |
| 2,317,816 | Scott | Apr. 27, 1943 |
| 2,324,527 | Morrison | July 20, 1943 |
| 2,325,231 | Curtis | July 27, 1943 |
| 2,348,524 | Cooper | May 9, 1944 |
| 2,420,971 | Peltier | May 20, 1947 |